United States Patent [19]
Spehrley, Jr. et al.

[11] Patent Number: 4,751,528
[45] Date of Patent: Jun. 14, 1988

[54] PLATEN ARRANGEMENT FOR HOT MELT INK JET APPARATUS

[75] Inventors: Charles W. Spehrley, Jr., Hartford, Vt.; Linda T. Creagh, West Lebanon; Robert R. Schaffer, Canaan, both of N.H.

[73] Assignee: Spectra, Inc., Hanover, N.H.

[21] Appl. No.: 94,664

[22] Filed: Sep. 9, 1987

[51] Int. Cl.[4] .................. G01D 15/16; G01D 9/00; G03G 15/16

[52] U.S. Cl. .................. 346/140 R; 346/1.1; 400/126; 250/316.1; 250/319

[58] Field of Search .............. 346/140 PD, 140 R, 1.1, 346/ 76 PH; 400/126; 250/316.1, 319

[56] References Cited

U.S. PATENT DOCUMENTS 4,140,907 2/1979 Oba .................. 250/319
4,593,292 6/1986 Lewis .................. 346/140 R

*Primary Examiner*—E. A. Goldberg
*Assistant Examiner*—Mark Reinhart
*Attorney, Agent, or Firm*—Brumbaugh, Graves, Donohue & Raymond

[57] ABSTRACT

In the particular embodiment described in the specification, a hot melt ink jet system includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

19 Claims, 2 Drawing Sheets

PLATEN ARRANGEMENT FOR HOT MELT INK JET APPARATUS

BACKGROUND OF THE INVENTION

This invention relates to ink jet systems and, more particularly, to a new and improved ink jet apparatus for use with hot melt inks providing controlled solidification of such inks.

Ink jet systems using inks prepared with water or other vaporizable solvents require drying of the ink (i.e., vaporization of the solvent) after it has been applied to a substrate, such as paper, which is supported by a platen. To facilitate drying of solvent-based inks, heated platens have previously been provided in ink jet apparatus.

Certain types of ink jet apparatus use inks, called "hot melt" inks, which contain no solvent and are solid at room temperature, are liquefied by heating for jet application to the substrate, and are resolidified by freezing on the substrate after application. In addition, the application of hot melt ink to a substrate by an ink jet apparatus transfers heat to the substrate. Moreover, the solidification of hot melt ink releases further thermal energy which is transferred to the substrate and supporting platen, which does not occur with the application of solvent-based inks. With high-density coverage this can raise the temperature of the paper and the platen above limits for acceptable ink penetration.

In order to control the penetration of hot melt inks into a permeable substrate such as paper to the desired extent, it is advantageous to preheat the substrate to a temperature close to but below the melting point of the hot melt ink. If the substrate temperature is too cold, the ink freezes after a short distance of penetration. This results in raised droplets and images with an embossed characteristic. Additionally, such ink droplets or images may have poor adhesion or may easily be scraped off or flake off by action of folding or creasing or may be subject to smearing or offsetting to other sheets. If the paper temperature is too high, for example, higher than the melting point of the ink, the ink does not solidify before it has penetrated completely through the paper, resulting in a defective condition called "print-through". In addition, an image printed on a substrate which is at a temperature in the vicinity of the melting point of the hot melt ink will appear noticeably different than an image printed at a lower substrate temperature. Such images exhibit characteristics of larger-than-normal spot size, fuzzy edges, blooming of fine lines and the like. Furthermore, contrary to the conditions required for the use of solvent-based inks in an ink jet apparatus, heating of the substrate after the ink has been deposited is ineffective to control the spread of the drops and to prevent the above-mentioned difficulties which may occur when using hot melt inks. Consequently, presently known ink jet apparatus using unheated or even heated-only platens are incapable of maintaining the conditions required for effective application of hot melt ink to a substrate to produce constant high-quality images.

SUMMARY OF THE INVENTION

Accordingly, it is an object of the present invention to provide a new and improved ink jet apparatus which is effective to overcome the above-mentioned disadvantages of the prior art.

Another object of the present invention is to provide an ink jet apparatus which is especially adapted for use with hot melt inks.

These and other objects and advantages of the invention are attained by providing an ink jet apparatus having a substrate-supporting, thermally conductive platen and a heater and a thermoelectric cooling arrangement both disposed in heat communication with the platen and including a heat pump for extracting heat from the platen in a controlled manner. Preferably, the apparatus also includes a temperature control system for controlling the heat pump and a thermoelectric heater responsive to the temperature control system for supplying heat to the platen when required to maintain a desired temperature. In addition, the platen preferably includes a vacuum system to retain the substrate in heat transfer relation to the platen during operation.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENT

Figure 1:
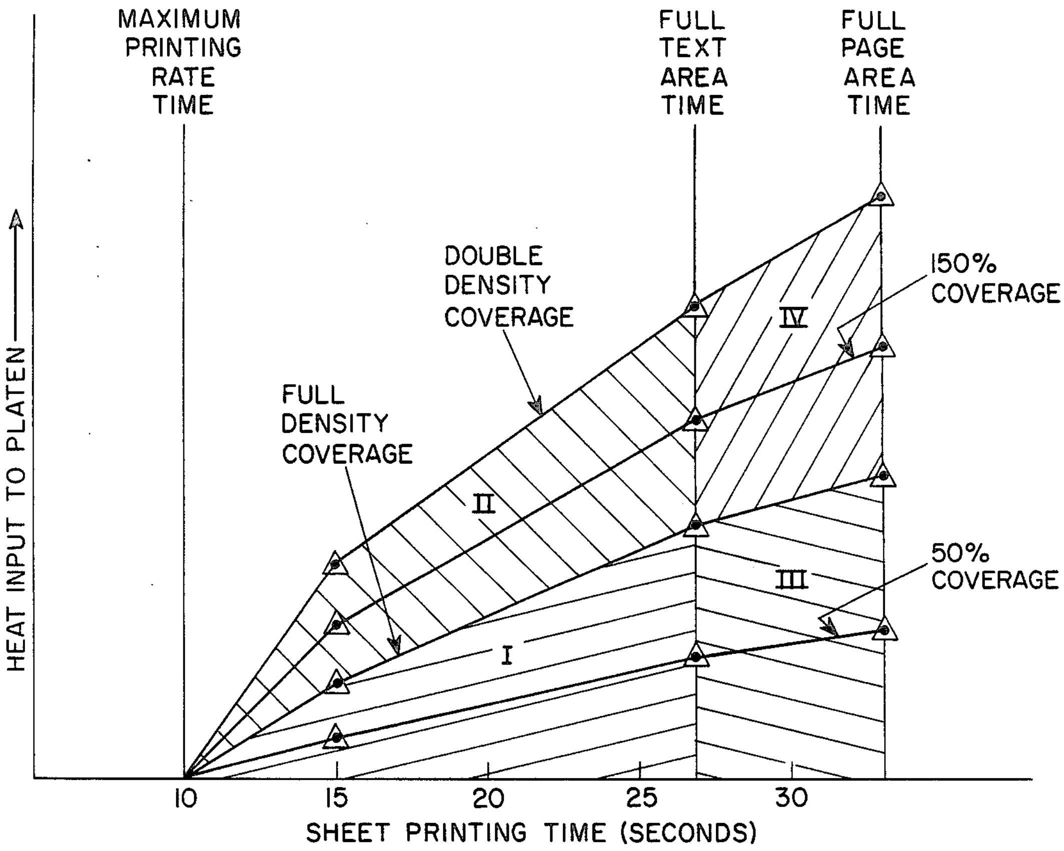
FIG. 1 is a graphical representation showing the heat input to a platen supporting a sheet substrate being printed with an ink jet for various sheet printing times and print coverage values.

In ink jet printing, the spot size on the paper depends on the initial drop volume and the degree to which this drop interacts with the substrate, said interaction affecting the degree of spread. In water-based ink jet systems, the ink wets the fibers and the drop tends to spread until fully absorbed by the fibers. This is generally considered a deficiency, since the absorbing characteristics of a range of plain papers is so great as to produce widely different print characteristics on different papers. In hot melt ink printing systems, the ink also wets the paper fibers, but the drop spread is limited by the cooling of the ink, which shares its thermal energy with the paper fibers until it freezes or until its viscosity becomes so high as to limit spreading motion. Fortunately, most papers have reasonably similar specific heats so that the drop spread is determined largely by the initial temperature of the ink drop and paper substrate in relation to the solidification temperature of the ink. As a consequence of the similarity of thermal characteristics of papers, similar images may be obtained on different papers if the substrate temperature is properly controlled.

In hot melt ink jet printers, the thermal energy applied to a unit area of a substrate such as paper depends upon the temperature of the hot melt ink when it reaches the substrate, the energy of solidification of the hot melt ink and the coverage of the substrate with ink during the printing. The temperature of the substrate immediately after printing depends upon the thermal energy applied during printing, the initial temperature of the substrate, and the temperature of a heat-conductive element such as a platen with which the substrate is in heat transfer relation.

Thus, a hot melt ink which solidifies at a selected temperature below the temperature at which it is applied to the substrate may solidify almost immediately if the substrate and its supporting platen are at a low temperature, substantially below the selected temperature, which may occur during start-up of the system. Such immediate solidification prevents sufficient penetration of the hot melt ink into the substrate before it solidifies. On the other hand, if the substrate and its supporting platen are at a temperature close to or above the solidification temperature of the hot melt ink, a relatively long time, such as several seconds, may be required for solidification, thereby permitting uncontrolled drop spread or print-through of the printed image. For example, a modern high-speed hot melt printer with a 96-jet head applying two layers of ink drops of different colors at a temperature of 130° C. to a substrate at a rate of 12,000 drops per second per jet with a linear density of 300 dots per inch, providing a total ink thickness of 0.9 mil, raises the bulk temperature of a 4-mil paper substrate by about 21° C. during the printing operation. With continued printing of a substrate which moves over a fixed platen in that manner, the platen temperature soon reaches a level approaching or above the solidification point of the hot melt ink.

FIG. 1 of the accompanying drawings illustrates schematically in graphical form the heat energy applied to a supporting platen when an 8.5"×11" paper sheet moving across the platen is being printed with hot melt ink.

As described hereinafter with reference to FIG. 4, there are a plurality of energy fluxes which determine whether there is a net heat input to the paper/platen system, in which case the temperature will tend to rise, or whether there is a net heat outflow from the paper/platen system, in which case the temperature in the printing zone will decrease. Heat energy is inputted to the system by heat transfer from the heated printhead across the airgap via conduction, convection and radiation, by the enthalpy in the ink drops, by the optional electrical power provided selectively by the heater controller, and by the heat content of the paper which enters the system. Energy outflow from the system includes heat energy in the paper and ink (which exits at a temperature higher than the paper's input temperature), heat transfer from the platen and from the paper which is not covered by the printhead to the surrounding air via convection, heat transferred from the platen to the surrounding structure via conduction through mounts and/or selectively via heat pump action of thermoelectric coolers.

As shown in FIG. 1, the heat input, represented by the ordinate in the graph, increases with increasing sheet printing time and with increasing percent coverage of the substrate. In this illustration, typical sheet printing times from about 10 seconds minimum to about 33 seconds maximum are shown and, as shown in the graph, the highest net heat input occurs at the slowest sheet printing time because the slowly moving sheet removes less thermal energy from the paper/platen system than is delivered by the enthalpy in the hot ink drops and by thermal transfer from the printhead to the paper/platen system.

Similarly, at any given sheet printing time, the heat input to the platen increases with increasing printing coverage, which is the percentage of sheet area covered by ink. Where two or more different colored inks are applied, the colored inks usually overlie each other at least to some extent. Consequently, the graphical illustration in FIG. 1 illustrates the heat input to the platen not only for 50% and 100% sheet coverage, but also for sheet coverage in excess of 100%, such as 150% and 200%, which corresponds to coverage of the entire sheet by two layers of ink. In general, sheets with lower coverage require less printing time.

FIG. 1 illustrates heat input to the platen under various printing conditions in four sections labelled I, II, III and IV. Section I shows the heat input to the platen when printing the 7"×9" normal full text area of an 8.5"×11" sheet with up to full density with a single layer of hot melt ink. When up to two full layers of hot melt ink are applied in overlying relation to the sheet during color printing, the heat energy transferred to the platen is illustrated in the section designated II. In that case, as shown in FIG. 1, up to twice the heat energy is transferred to the platen.

The section designated III in FIG. 1 illustrates the heat input to the platen when printing a single layer of ink at up to full density on a "full page" area of an 8.5"×11" sheet, i.e., to within 0.38" of the top left and bottom edges and within 0.10" of the right edge of the sheet, and the section designated IV illustrates the heat input for full-page area printing with up to a double layer of hot melt ink. With color printing of solid area patterns, such as pie charts or the like, operation is frequently in the region designated III and IV, providing very high thermal energy input to the platen.

The platen temperature depends not only on the rate of heat input, but also on the rate of removal of heat energy from the platen. To maintain a selected platen temperature assuring proper operation of a hot melt ink jet apparatus, especially under conditions such as are shown in sections III and IV, therefore, heat energy must be removed rapidly and efficiently from the platen. It has been found that removal of the heat energy from a platen by conduction or convection to a moving air stream may be inadequate, especially when the local ambient air temperature rises to within 5° or 10° C. of the operating set point. At these and other times, the system is incapable of sufficiently precise control to maintain the platen temperature within desired limits for optimum operation.

For example, on initial start-up, a conductively or convectively cooled platen will be at room temperature (i.e., 21° C.) whereas, in order to allow sufficient penetration of a hot melt ink into a fibrous substrate such as paper prior to solidification, it is desirable to maintain the substrate at about 40° C. On start-up, therefore, the addition of heat to the platen is necessary. On the other hand, when continuous printing of the type described above occurs using hot melt ink at 130° C., for example, the platen temperature quickly reaches and exceeds 40° C. and approaches the solidification temperature of the hot melt ink, thereby requiring removal of heat from the platen. Furthermore, frequent and extreme changes in the printing rate such as occur in the reproduction of solid-colored illustrations such as pie charts intermittently with single-color text will cause corresponding extreme fluctuations in the temperature of the platen and the substrate being printed, resulting in alternating conditions of print-through and insufficient ink penetration into the substrate.

Figure 2:
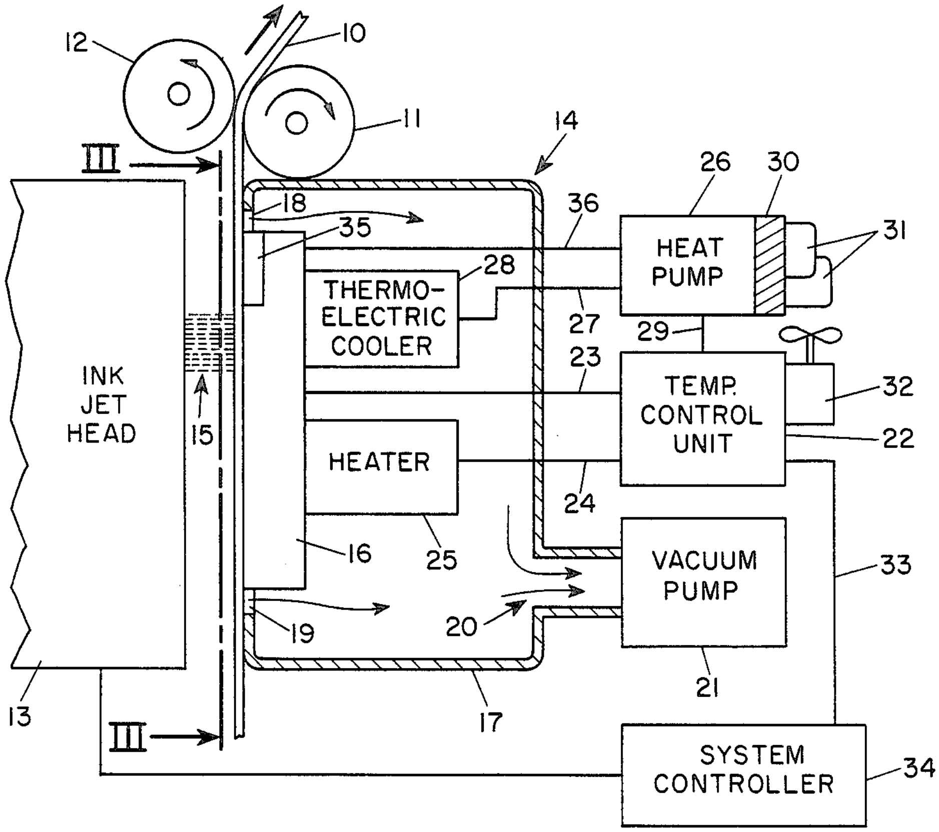
FIG. 2 is a schematic sectional view illustrating a representative temperature-controlled platen arrangement in accordance with the present invention.
Figure 3:
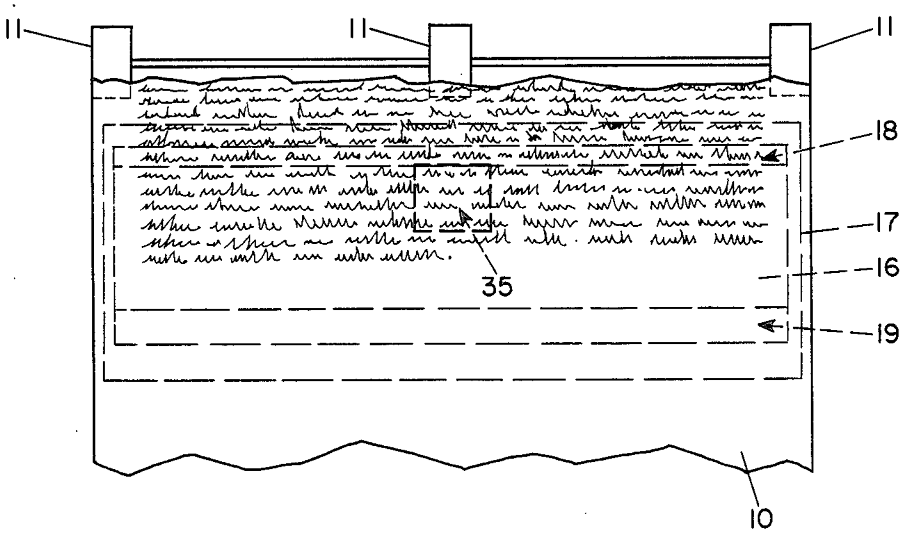
FIG. 3 is a schematic sectional view taken along the lines III—III of FIG. 2 and looking in the direction of the arrows.

In the representative embodiment of the invention illustrated in FIGS. 2 and 3, the platen temperature of a hot melt ink jet apparatus is maintained at a desired level to provide continuous optimum printing conditions. As shown in FIG. 2, a sheet or web 10 of a substrate material such as paper is driven by a drive system including a set of drive rolls 11 and 12 which rotate in the direction indicated by the arrows to move the substrate material through the gap between an ink jet head 13 and a platen assembly 14. The ink jet head is reciprocated perpendicularly to the plane of FIG. 2 so as to project an array of ink jet drops 15 onto the surface of the substrate in successive paths extending transversely to the direction of motion of the web 10 in a conventional manner. The platen assembly 14 includes a platen 16 mounted in a housing 17 having slit openings 18 and 19 at the upper and lower edges of the platen 16 and an exhaust outlet 20 at the rear of the housing leading to a vacuum pump 21 or blower. The housing 17 may be substantially airtight, or for purposes of substantially continuous heat removal to the air, even when paper covers the face openings, additional air ports may be provided. As best seen in FIG. 3, the platen 16 and the adjacent vacuum slits 18 and 19 extend substantially across the width of the web 10 of substrate material and the web is driven by three drive rolls 11 which form corresponding nips with adjacent pinch rolls 12, one of which is shown in FIG. 2.

To assure that the temperature of the substrate 10 is maintained at the desired level to permit sufficient penetration of the hot melt ink drops 15 without permitting print-through, a temperature control unit 22 detects the temperature of the platen 16 through a line 23. If it is necessary to heat the platen to maintain the desired platen temperature, for example, on start-up of the apparatus or when printing at low coverage or with low sheet printing times, the control unit 22 supplies power through a line 24 to a conventional resistance-type heater or thermistor 25 to heat the platen until it reaches the desired temperature of operation.

In addition, an electrical heat pump 26 is connected by a line 27 to a thermoelectric cooler 28, for example, of the type designated CP 1.0-63-06L, available from Melcor, which is in thermal contact with the platen 16. When the temperature control unit 22 detects a platen temperature above the desired level resulting, for example, from printing at high coverage or with high sheet printing times, it activates the heat pump through a line 29 to transfer thermal energy from the thermoelectric cooler 28 through the line 27 to the pump which in turn transfers thermal energy to a heat sink 30. The heat sink 30, which may, for example, be a structural support member for the entire platen assembly, has fins 31 for radiative and convective heat dissipation and is provided with a forced air cooling arrangement 32 to assure a high enough rate of heat removal to permit the heat pump 26 to maintain the desired platen temperature. If extreme conditions are encountered in which the heat energy is supplied to the web 10 and the platen 16 by the ink jet head 13 at a rate which exceeds the capacity of the thermoelectric cooler 28 and the heat pump 26 to maintain the desired temperature, the control unit 22 may send a command signal through a line 33 to an ink jet system control device 34 which will reduce the rate at which ink drops are applied by the ink jet head 13 to the web 10 until the heat pump 26 is again able to maintain a constant platen temperature.

Although the platen temperature is thus controlled to assure prompt solidification of the ink drops in the array 15 after sufficient penetration into the substrate 10, the temperature of the solidified ink drops may not be low enough when the substrate reaches the nip between the drive rolls 11 and the pinch rolls 12 to prevent offsetting of ink onto the pinch roll 12 opposite the center drive roll 11 shown in FIG. 3. To avoid that possiblity, a small quench zone is provided by another thermoelectric cooler 35 connected by a line 36 to the heat pump 26 which is arranged to maintain a temperature in that zone at least 10° C. lower than the temperature of the platen 16 in order to assure complete solidification of the ink in that zone.

As shown in FIG. 3, the thermoelectric cooler 35 is aligned with the drive roll 11 and its associated pinch roll so that the strip of the web 10 which passes between those rolls is cooled by the element 35. At the edges of the web 10, on the other hand, the other drive rolls 11 and their associated pinch rolls are positioned in a narrow margin in which no printing occurs. Consequently, quenching is unnecessary in those regions.

In another platen embodiment, the quench zone downstream of the temperature-controlled platen may be provided completely across the width of the paper. Said quench zone may be, for example, a portion of the platen support member which has adequate heat sink capability.

In operation, the platen 16 is heated if necessary by the heater 25 to raise it to the desired temperature, such as 40° C. The vacuum pump 21 exhausts air from the housing 17 and draws air through the apertures 18 and 19, as indicated by the arrows in FIG. 2, to hold the web 10 in thermal contact with the platen 16 as it is advanced by the drive rolls 11 and associated pinch rolls 12. The ink jet head 13 sprays hot melt ink 15 onto the web 10 and the resulting increase in platen temperature is detected by the control unit 22, causing the heat pump 20 to transfer thermal energy from the thermoelectric cooler 28 to the heat sink 30 and the fins 31 from which it is removed by the forced-air cooling system 32.

For conventional hot melt inks, the ink jet head 13 maintains the ink at a jetting temperature of, for example, 130° C., but the ink solidifies at, for example, 60° C. and, to assure solidification after the desired degree of penetration but before print-through occurs, the platen 16 should be maintained within about 3°-5° C. of a selected lower temperature, for example, 40° C. During normal operation of the ink jet apparatus, however, the ambient temperature of the platen assembly 14 and its surrounding components may be at or above 40° C. Accordingly, the heat pump 26 may be arranged to transfer heat continuously from the thermoelectric coolers 28 and 32 to the heat sink 30 even during quiescent periods in the operation of the system. During ink jet operation, moreover, especially operation in regions II and IV in FIG. 1, substantially more heat is extracted from the platen and transferred to the heat sink 30, which may thus be heated to a relatively high temperature of, for example, 60°-65° C., and the heat energy is removed from the heat sink 30 and the fins 31 by the forced-air system 32. At the same time, the thermoelectric cooler 32 in the quench zone is maintained about 10° C. cooler than the rest of the platen, for example, at 30° C., assuring complete solidification of ink before engagement by a pinch roll.

Because the size and nature of the printed image may vary widely, it is necessary to use a temperature-controlled platen with high lateral thermal conductivity in order to minimize temperature gradients from one side to the other. Aluminum and copper are suitable platen materials, but the cross-sectional area of the platen must be significant, on the order of 0.5 square inch or larger in the case of aluminum. Such platens are massive and may take much space and require high power or long times to heat up to operating temperature. For these reasons, a structure embodying the characteristics of a heat pipe with evaporation and condensation of liquid to transfer energy may be employed.

Other problems may occur in the control of the web as it moves across the platen in the print zone. One such problem relates to differential thermal expansion of film media (e.g., Mylar) and another relates to differential shrinkage of paper as it is heated and dried by the platen. In these cases, the web may buckle or cockle and move off the platen surface by 0.005 or more inches, which degrades the thermal connection between paper and platen and which also degrades dot placement accuracy by changing the point of impact of the jets, especially in the case of bidirectional printing.

Figure 4:
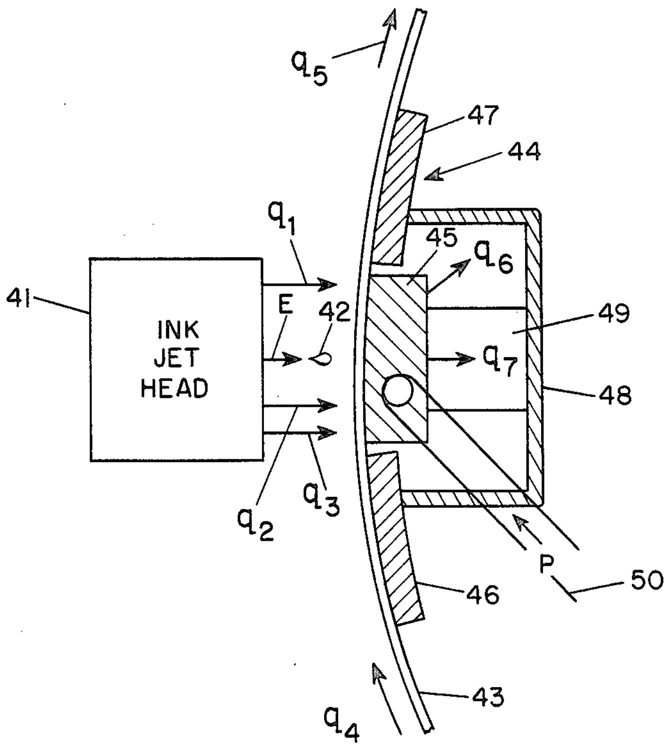
FIG. 4 is a schematic sectional view illustrating another embodiment of the invention and showing the energy flux into and out of the paper and platen system.

To avoid these problems, the platen configuration shown in FIG. 4 may be used. In this arrangement, an ink jet head 41 projects ink drops 42 toward a web of paper 43 supported by a curved platen 44 which causes the paper 43 to be held in curved configuration and thereby stiffened against buckling and cockling. A suitable curved platen 44 has a radius of curvature of about 5 to 10 inches has a temperature-controlled portion 45 of the type described with reference to FIG. 2 in the printing zone and a curved inlet portion 46 and a curved outlet portion 47. The inlet and outlet portions 46 and 47 extend at least 10° ahead of and 10° after the temperature-controlled portion 45. Thus, the temperature-controlled portion need not extend for the entire length of the curved paper path, but may occupy only about one-half inch of paper length, the inlet portion 46 and outlet portion 47 of the curved paper path being at temperatures which are more suitable for paper handling or quenching prior to passing into paper feed rolls of the type shown in FIG. 2. A housing 48 encloses the temperature-control zone for the platen 45 and a temperature-control component 49 which may include a thermoelectric cooler of the type described with reference to FIG. 2 are mounted in contact with the platen 45 in the temperature-control zone. A power line 50 energizes the heater in the portion 45 when it is necessary to add heat to the platen.

In the arrangement shown in FIG. 4, the energy flux into and out of the paper/platen system is represented as follows:

Energy Flux Into Paper/Platen System

- $q_1$=radiant heat transfer from ink jet head 41.
- $q_2$=conduction through the air.
- $q_3$=convection from ink jet head 41 to platen.
- E=enthalpy in the ink drops.
- $q_4$=heat energy in entering paper at temperature $T_{in}$.
- p=heat transferred by heater into platen.

Enerqy Flux Out of Paper/Platen System

- $q_5$=heat energy exiting with the paper and ink at temperature $T_{out}$.
- $q_6$=heat energy removed from platen by convective heat transfer to the air.
- $q_7$=heat removed from platen by conduction through mounts and/or by heat pump action.

Although the invention has been described herein with reference to a specific embodiment, many modifications and variations therein will readily occur to those skilled in the art. Accordingly, all such variations and modifications are included within the intended scope of the invention as defined by the following claims.

We claim:

1. Ink jet apparatus comprising an ink jet means for projecting ink at elevated temperature onto a substrate, platen means for supporting the substrate during operation of the ink jet means, and temperature control means for controlling the temperature of the platen means during operation including heat pump means for removing heat from the platen means so as to maintain a desired platen means temperature.

2. Apparatus according to claim 1, wherein the heat pump means includes thermoelectric cooler means in thermal contact with the platen means.

3. Apparatus according to claim 1, including electrical heater means responsive to the temperature control means for heating the platen means when the temperature of the platen means is below a desired level.

4. Apparatus according to claim 1, including pinch roll drive means for moving a substrate with respect to the ink jet means and the platen means and wherein the heat pump means includes second thermoelectric cooler means disposed in aligned relation with the pinch roll means in the direction of motion of the substrate to quench hot melt ink applied to a portion of a substrate prior to engagement by the pinch roll means.

5. Apparatus according to claim 1, including airtight housing means surrounding the platen means, vacuum pump means communicating with the interior of the airtight housing means, and aperture means provided in the airtight housing means for retaining a substrate in thermal contact with the platen means.

6. Apparatus according to claim 1, including heat sink means in thermal contact with the heat pump means to receive and dissipate heat therefrom.

7. Apparatus according to claim 6, wherein the heat sink means comprises a structural member supporting the platen means and including forced-air cooling means for cooling the heat sink means.

8. Apparatus according to claim 6, wherein the heat sink means is provided with fins to facilitate cooling of the heat sink means.

9. Apparatus according to claim 1, including system control means for controlling the operation of the ink jet means and responsive to a control signal from the temperature control means to change the rate of operation of the ink jet means.

10. Apparatus according to claim 1 wherein the platen means includes a curved platen surface and means for retaining the substrate in contact with the curved platen surface.

11. Apparatus according to claim 10 wherein the curved platen surface has a radius of curvature between about 5 and about 10 inches and extends at least about 10° ahead of and 10° after the location of the heat pump means.

12. Ink jet apparatus comprising ink jet means for projecting ink at elevated temperature onto a substrate, support means for supporting the substrate during operation of the ink jet means, and heat energy flux control means for controlling the heat energy flux into and out of the substrate so as to control the rate of solidification of ink after it has been projected onto the substrate.

13. Apparatus according to claim 12 including heat pump means for removing heat from the substrate support means in accordance with the substrate support means temperature.

14. Apparatus according to claim 12 including heating means for heating the substrate support means in accordance with the substrate support means temperature.

15. Apparatus according to claim 12 wherein the heat energy flux control means maintains the temperature of the support means at about 20° to 30° C. below the solidification temperature of the ink.

16. An ink jet printer system comprising ink jet means for directing drops of molten hot melt ink having a selected melting point toward a recording medium and heater means for heating the recording medium to a selected temperature below the melting point of the hot melt ink.

17. An ink jet printer system according to claim 16 where the selected temperature is about 20° C. to 30° C. below the melting point of the hot melt ink.

18. An ink jet printer system according to claim 16 wherein the melting point of the hot melt ink is approximately 60° C.

19. An ink jet printer system according to claim 16 wherein the selected temperature is approximately 40° C.

* * * * *

REEXAMINATION CERTIFICATE (1584th)

United States Patent [19]

[11] B1 4,751,528

Spehrley, Jr. et al.

[45] Certificate Issued Oct. 29, 1991

[54] PLATEN ARRANGEMENT FOR HOT MELT INK JET APPARATUS

[75] Inventors: Charles W. Spehrley, Jr., Hartford, Vt.; Linda T. Creagh, West Lebanon; Robert R. Schaffer, Canaan, both of N.H.

[73] Assignee: Spectra, Inc., Hanover, N.H.

Reexamination Request:
No. 90/002,089, Jul. 13, 1990

Reexamination Certificate for:

| | |
|---|---|
| Patent No.: | **4,751,528** |
| Issued: | **Jun. 14, 1988** |
| Appl. No.: | **94,664** |
| Filed: | **Sep. 9, 1987** |

[51] Int. Cl.[5] ........................ G01D 15/16; G01D 9/00; G03G 15/16

[52] U.S. Cl. .................................... 346/140; 346/1.1; 400/126; 250/316.1; 250/319

[58] Field of Search ............... 346/140 R, 1.1, 76 PH; 400/126; 250/316.1, 319

[56] References Cited

U.S. PATENT DOCUMENTS

| | | | |
|---|---|---|---|
| 4,140,907 | 2/1979 | Oba | 250/316 |
| 4,435,732 | 3/1984 | Hyatt | 358/254 |
| 4,484,948 | 11/1984 | Merritt | 106/31 |
| 4,550,324 | 10/1985 | Tamaru et al. | 346/76 PH |
| 4,593,292 | 6/1986 | Lewis | 346/1.1 |

FOREIGN PATENT DOCUMENTS

| | | |
|---|---|---|
| 55-84670 | 6/1980 | Japan . |
| 56-113462 | 9/1981 | Japan . |
| 62-135370 | 6/1987 | Japan . |

*Primary Examiner*—Mark Reinhart

[57] ABSTRACT

In the particular embodiment described in the specification, a hot melt ink jet system includes a temperature-controlled platen provided with a heater and a thermoelectric cooler electrically connected to a heat pump and a temperature control unit for controlling the operation of the heater and the heat pump to maintain the platen temperature at a desired level. The apparatus also includes a second thermoelectric cooler to solidify hot melt ink in a selected zone more rapidly to avoid offset by a pinch roll coming in contact with the surface of the substrate to which hot melt ink has been applied. An airtight enclosure surrounding the platen is connected to a vacuum pump and has slits adjacent to the platen to hold the substrate in thermal contact with the platen.

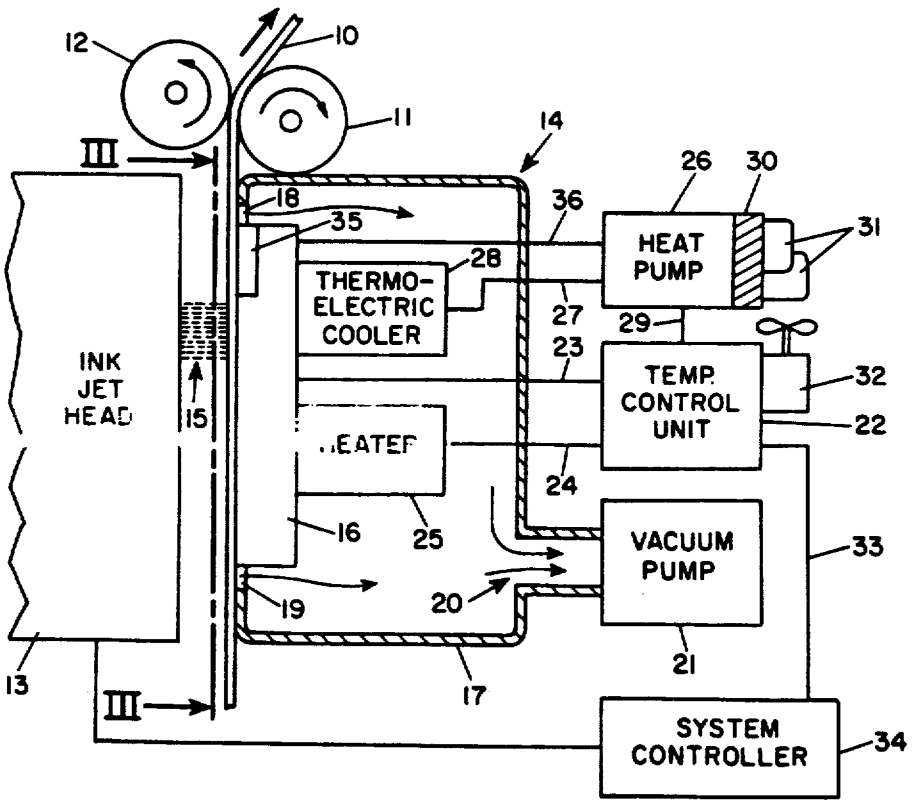

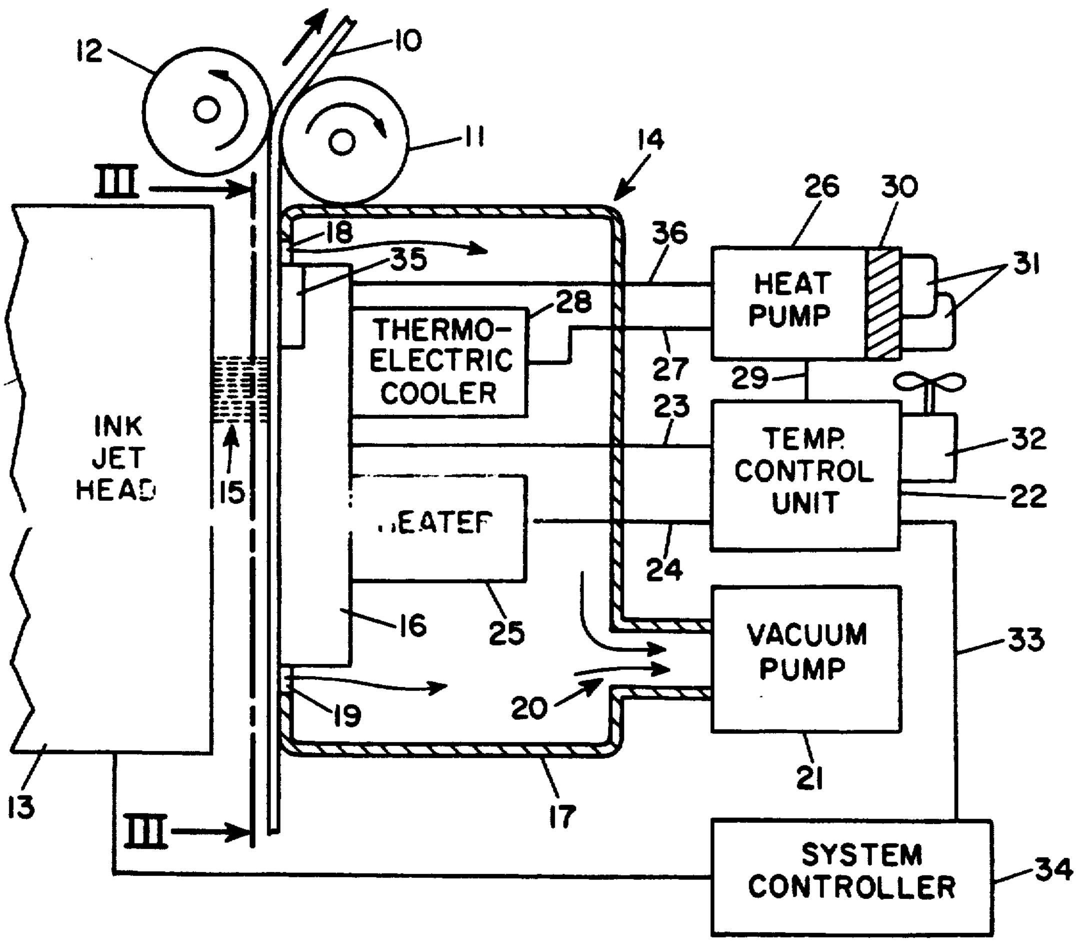
12
10
11
14
III
18
35
26
30
36
HEAT PUMP
31
28
THERMO-ELECTRIC COOLER
27
29
23
TEMP. CONTROL UNIT
32
22
INK JET HEAD
15
HEATER
24
VACUUM PUMP
33
16
25
20
19
21
13
17
III
SYSTEM CONTROLLER
34

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 to 11 is confirmed.

Claims 12, 13 and 16 are determined to be patentable as amended.

Claims 14, 15, 17, 18 and 19, dependent on an amended claim, are determined to be patentable.

12. Ink jet apparatus comprising ink jet means for projecting ink at elevated temperature onto a substrate, support means for supporting the substrate during operation of the ink jet means, and heat energy flux control means [for controlling] *responsive to heat input to the substrate from the ink applied thereto during operation of the ink jet means for controllably heating the substrate to control* the heat energy flux into and out of the substrate so as to *maintain the substrate at a selected temperature and thereby* control the rate of solidification of ink after it has been projected onto the substrate.

13. [Apparatus according to claim 12] *Ink jet apparatus comprising ink jet means for projecting ink at elevated temperature onto a substrate, support means for supporting the substrate during operation of the ink jet means, and heat energy flux control means for controlling the heat energy flux into and out of the substrate so as to control the rate of solidification of ink after it has been projected onto the substrate* including heat pump means for removing heat from the substrate support means in accordance with the substrate support means temperature.

16. An ink jet printer system comprising ink jet means for directing drops of molten hot melt ink having a selected melting point toward a recording medium and heater means *responsive to the heat input to the recording medium from molten hot melt ink applied thereto during operation of the ink jet means* for *controllably* heating the recording medium to *maintain the recording medium at* a selected temperature below the melting point of the hot melt ink.

* * * * *